UNITED STATES PATENT OFFICE.

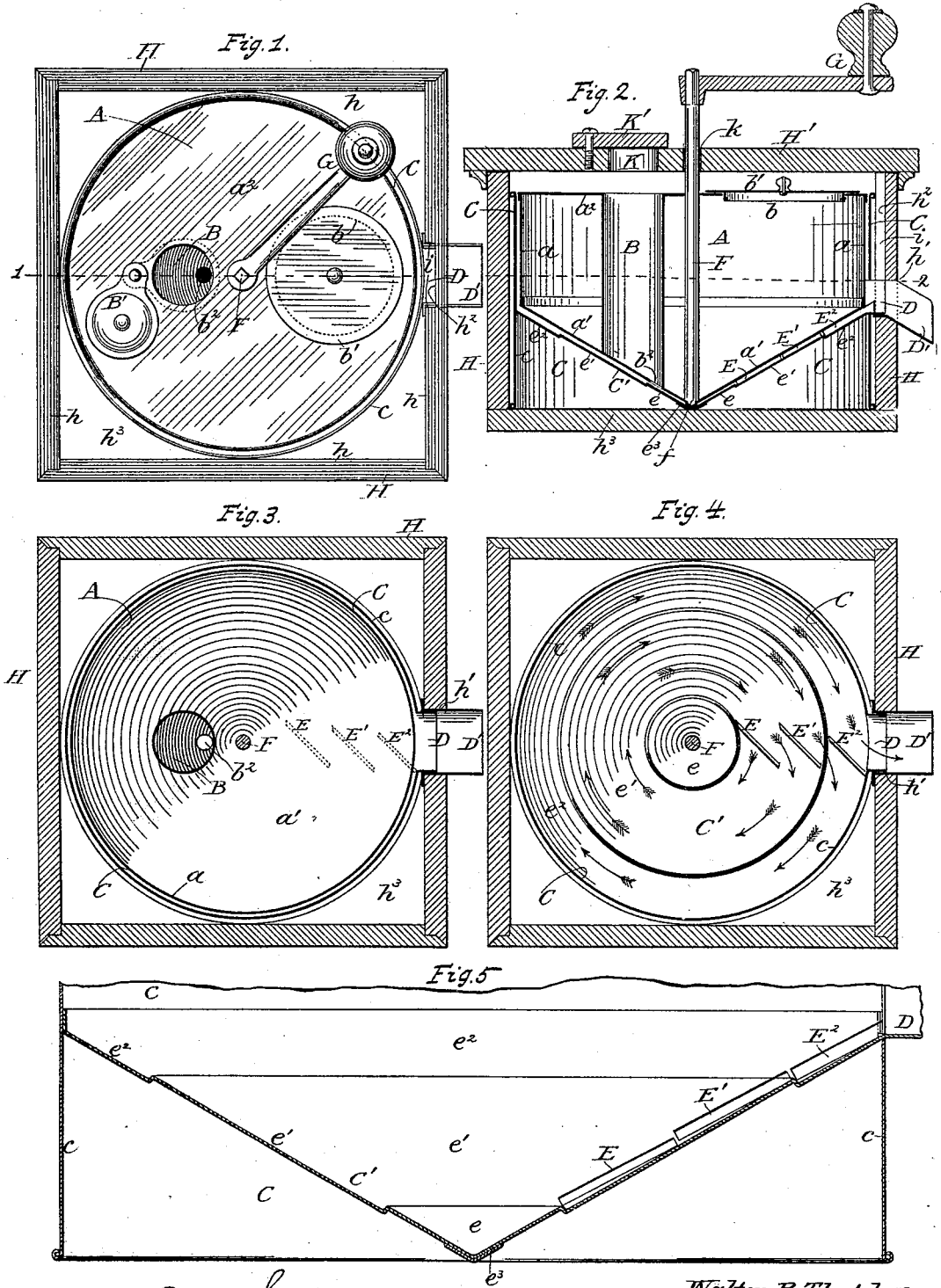

WALTER R. THATCHER, OF OSKALOOSA, IOWA.

ICE-CREAM FREEZER.

SPECIFICATION forming part of Letters Patent No. 521,426, dated June 12, 1894.

Application filed August 1, 1893. Serial No. 482,055. (No model.)

*To all whom it may concern:*

Be it known that I, WALTER R. THATCHER, a citizen of the United States, residing at Oskaloosa, in the county of Mahaska and State of Iowa, have invented certain new and useful Improvements in Ice-Cream Freezers; and I do hereby declare the following to be a full, clear, and exact description of the invention, such as will enable others skilled in the art to which it appertains to make and use the same.

My invention relates to ice cream freezers and especially to improvements in the ice cream freezer shown in Letters Patent No. 462,696, dated November 10, 1891; and it consists of the devices and combination of devices hereinafter particularly described and set forth in the claims.

The objects of my invention are to provide in a freezer of the class above referred to for freezing cream, water and other fluids, and for chilling liquids, means for making the freezer more effective for chilling the material operated with; for preventing the material from clogging in its passage from the freezing chamber to the discharge; for preventing the outer atmosphere from affecting the temperature of the outer walls of the ice cylinder; and for holding the axis of the revolving ice cylinder in a vertical position, and the said cylinder from shifting laterally in any direction. I attain these objects by the means illustrated in the accompanying drawings forming a part of this specification, in which—

Figure 1 is a plan view of the freezer embodying the improvements in this invention, with the top or cover of the outer case removed. Fig. 2 is a sectional elevation of the same, taken at line 1 in Fig. 1, with the top of the outer case in place. Fig. 3 is a sectional view taken at line 2 in Fig. 2. Fig. 4 is a plan view of the inside case with the revolving ice cylinder removed, and illustrating the peculiar features of the same. Fig. 5 is a sectional view, on an enlarged scale, of the stationary material supporting bottom of the inner case, and illustrating the peculiar features of the same.

The same letters of reference refer to similar parts throughout the several views.

In the drawings A represents the revolving ice cylinder formed of the cylindrical wall $a$, conical form bottom $a'$ and top wall $a^2$. Access is had to the chamber of the said cylinder through a suitable opening $b$ for introduction of ice and other materials intended to operate as the refrigerating agent, and $b'$ is a cover for closing the same.

B is the fluid chamber extending from the top wall $a^2$ through the ice chamber to the conical form bottom $a'$, and may be provided with a cover B′ as shown in Fig. 1, or the cover may be omitted, if preferred, from the upper end as shown in Fig. 2. A discharge opening $b^2$ is provided at the lower end of said fluid chamber, through the bottom $a'$, by which the fluid material may have passage to the freezing chamber below.

C is a cylindrical case for containing the revolving ice cylinder A, and is of such a diameter as to nicely receive said ice cylinder and allow it to freely revolve therein. The cylindrical wall $c$ of this case may be made of any suitable material, as may be preferred, and it extends from a point preferably about on a line with the plane of the top wall $a^2$, of the ice cylinder to a point preferably about on a line with the plane of the lower and central portion of the material supporting bottom C′, which is contained within this cylindrical case, and is securely fixed at its circumference to the same.

The above described ice cylinder A and its adjuncts, and the cylindrical case C, with a conical form material supporting bottom, form no part of this invention and are shown in substantially the same form in the Letters Patent before referred to.

The conical material supporting bottom C′, marked by reference figure 2 in Letters Patent No. 462,696 referred to, was made with a continuous plain conical upper side surface, from its center to circumference, and with the incline of the plane of such upper side surface about parallel with the plane of the lower side surface of the bottom $a'$ of the ice cylinder.

In this invention, the upper side of this material supporting bottom is made with a series of zones or concentric planes $e$ $e'$ $e^2$, each of the same inclination as the other, but on successively lower lines, as shown in Figs. 2 and 5, and beginning with the central zone $e$ and dropping successively below the line of the upper surface plane of the preceding zones to a distance of about one sixteenth of an inch, more or less, accordingly as the diameter of the said bottom C' may be increased or lessened; that is to say, the plane of the upper surface of the zone $e'$ drops below the plane of the upper surface of the zone $e$, to the short distance described, while that of zone $e^2$ drops below that of zone $e'$ about the same distance, so that when the ice cylinder A is in place within the case C, the central zone $e$ of material supporting surface of the bottom C' will be near the lower side surface of the bottom $a'$, of the ice cylinder, so as to allow but a very small quantity of fluid material to occupy the chamber between said central zone and said bottom, while the plane of the upper surface of zone $e'$ will be farther away from the lower surface of the bottom $a'$, above, so as to allow the material, while being frozen, to expand and have a free and gradual movement outwardly from the zone $e$ toward and to zone $e^2$. The zone $e^2$, of the material supporting surface, being at a still greater distance from the lower side of bottom $a'$, allows the already frozen material, passing into the chamber between the surface of said zone and the said bottom, to move freely in its passage over the full circumference of said zone to the discharge into the spout D, without the outer circumference of the bottom $a'$ becoming clogged or carrying the frozen material with it while being revolved.

Fixed to the material supporting bottom C' is a series of guide bars E E' $E^2$ which operate as deflecting devices for forcing the material to be progressively moved outwardly from the central zone $e$ toward the circumference of the said bottom, and in circular lines of direction, as indicated by arrows 1, 2 and 3, and thence to an exit into the spout D.

F is the shaft of the ice cylinder A which extends from the point of the conical bottom of the ice cylinder, upwardly through the chamber of the same, and then projected above the top wall of the said cylinder to a suitable distance. The foot end of this shaft F is provided with a suitable end journal $f$ which seats in the step $e^3$, provided centrally in the central zone $e$ of the material supporting bottom C'. This shaft is arranged vertically and centrally in said ice cylinder, and is securely fixed with the bottom $a'$ and top $a^2$, preferably by solder so as to hold strongly with the same. The upper end of this shaft is provided with a crank handle G for revolving it and the ice cylinder in which it is secured.

H is an outer case made of any non-conducting material such as wood, paper pulp or metal lined with pulp board or sheet asbestus, and it may be made with a circular, square or other form as may be preferred. The chamber of this case is of capacity to nicely receive the cylindrical case C, and hold it from shifting laterally.

In one of the side walls $h$ is provided an opening $h'$, Figs. 2, 3 and 4, for the reception of the supplemental discharge spout D'; and in the inner side of the same wall $h$ is made the vertical way $h^2$, Figs. 1 and 2, which extends from the upper edge of wall $h$ to the opening $h'$, for passage of the fixed discharge spout D down to its place in the opening $h'$ when the cylindrical case is being introduced within the non-conductor case H. The sides $i$ $i$ of this vertical way $h^2$ coact with the sides of the spout to hold the said cylindrical case from turning within said case H. The supplemental spout D' is preferably made removable at will and for that purpose it is provided, on the receiving ends of its sides, with flanges $d$ $d$ which hold with the inner side of the wall $h$, of the non-conductor case, so as not to be drawn from the opening $h'$. The bottom $h^3$ of this case H, operates to support the cylindrical case C, besides forming a non-conducting piece between the material supporting bottom C' and the outer atmosphere. This case H is provided with a suitable removable cover H' which is held by any suitable means from shifting laterally in relation to the said cases C and H; a perforation $k$, for service as a bearing for the upper portion of the vertical shaft F, is provided centrally in said cover, so that the ice cylinder, by the coaction of the step, receiving the lower end journal of the said shaft, with the perforation or bearing $k$ provided with the cover, will be held in true vertical position within the case C and without liability of shifting. Access may be had to the liquid chamber B by any suitable means, but preferably by means of the opening K, provided in the said cover, as shown in Fig. 2, and a swing cover K', preferably pivoted with the cover, may be employed for closing said opening. If preferred, the liquid chamber B, in the ice cylinder, may be covered by any suitable cover B' which may be removable, at will, from over the said chamber.

The ice and salt, in suitable proportions, are introduced into the ice cylinder as described in the Letters Patent above referred to, and the material is introduced into the chamber B, and the same mode of procedure is employed for operations for freezing cream, milk, flavored waters or other liquids as set forth in the said patent.

The above described improvements, though simple and inexpensive, operates to make the apparatus more durable, and at the same time they render it easier for operation, more free in its delivery of the frozen material, and prevents the outer atmosphere from materially affecting the freezing agent within the ice cylinder.

Having described my invention, what I claim as new is—

1. In an ice cream freezer having a revolving ice cylinder, provided with a conical form bottom, the combination with the same, of a conical material supporting bottom which corresponds with the angle of the conical bottom of the said ice cylinder, and having the series of zones or concentric planes $e$ $e'$ $e^2$, of upper side surfaces in which each succeeding zone or plane is at a short distance below the line of surface of the preceding one, and the series of guide bars E E' E² fixed to said material supporting bottom, substantially as and for the purposes set forth.

2. In an ice cream freezer, the combination with the case C, inverted cone shaped material supporting bottom C' fixed within said case and having step $f$ at its apex, a series of guide bars E E' and E² secured to the upper side of the said bottom, and a revolving ice cylinder having the bottom $a'$ substantially corresponding in form with the said material supporting bottom, of a vertical shaft secured centrally within the said ice cylinder and having its foot end secured to the apex of the said bottom of the ice cylinder and having its upper portion secured to the top wall of the same with the end thereof extended upwardly above the said top wall, a crank handle secured to the upper end of said vertical shaft for revolving the said ice cylinder, and the stationary bearing $k$ between the top wall of the said revolving ice cylinder and the said crank handle, whereby the pressure of the frozen material, at the said guide bars, against the bottom of the revolving ice cylinder will be prevented from canting the same out from its normal position when the freezer is being operated, substantially as and for, the purposes set forth.

3. In an ice cream freezer, the combination with an ice cylinder, closed by a top wall and provided with a vertical shaft for revolving the same and having an inverted cone shaped bottom for separating the refrigerating agent within it from the material to be frozen below it, the fluid chamber B separated by a vertical wall, between the top wall and bottom of the said cylinder, from the refrigerating agent, the stationary inverted cone shaped bottom C' for supporting the material, to be frozen, in contact with the said bottom of the ice cylinder, the case C having vertical side walls and secured to the said stationary cone shaped bottom and inclosing both the side wall of the ice cylinder and the downwardly projected cone shaped bottom and provided with the discharge spout D, of the outer case H having its side walls and bottom of non-conducting material and supporting within it the case C from its bottom, and provided with opening $h'$, the discharge spout D' communicating from the spout D leading from the case C to the outside of said outer case, and the removable cover H having in it the central bearing $k$ for support of the vertical shaft of the ice cylinder and provided with the covered opening K for access to the fluid chamber B, substantially as and for the purposes set forth.

4. The combination with the case supporting the revolving ice cylinder and a fixed discharge spout, fixed to the same, for leading the frozen material to an exit, of the outer case H provided, within its wall, with opening $h'$ and vertical way $h^2$ through which the said fixed discharge may pass to opposite said perforation, and a supplemental discharge spout contained within the said opening, and telescoping with the said fixed discharge spout, substantially as and for the purposes set forth.

In testimony that I claim the invention above set forth I affix my signature in presence of two witnesses.

WALTER R. THATCHER.

Witnesses:
A. SELKIRK, Jr.,
J. PLADWELL.